(12) United States Patent
Calabrese et al.

(10) Patent No.: US 7,031,589 B2
(45) Date of Patent: Apr. 18, 2006

(54) MATERIAL FOR ATTENUATING LIGHT SIGNALS WITH LOW REFLECTANCE IN A FIBER OPTIC NETWORK

(75) Inventors: Frank Calabrese, South Elgin, IL (US); Kaushik Chakrabarty, Gahnna, OH (US); Arturo Hale, New York, NY (US); Robert C. Moore, Roswell, GA (US)

(73) Assignee: Furukawa Electric North America, Norcross, GA (US)

( * ) Notice: Subject to any disclaimer, the term of this patent is extended or adjusted under 35 U.S.C. 154(b) by 157 days.

(21) Appl. No.: 10/847,058

(22) Filed: May 17, 2004

(65) Prior Publication Data
US 2004/0264908 A1   Dec. 30, 2004

Related U.S. Application Data

(63) Continuation-in-part of application No. 10/291,323, filed on Nov. 9, 2002, now abandoned.

(51) Int. Cl.
*G02B 6/00* (2006.01)

(52) U.S. Cl. ...................................... 385/140; 359/288
(58) Field of Classification Search ............... 359/288, 359/289; 235/137, 140; 385/140
See application file for complete search history.

(56) References Cited

U.S. PATENT DOCUMENTS

| | | | | |
|---|---|---|---|---|
| 5,073,615 A | * | 12/1991 | Shen | 526/262 |
| 5,082,345 A | | 1/1992 | Cammons et al. | |
| 5,319,043 A | * | 6/1994 | Shen | 526/262 |
| 5,619,610 A | | 4/1997 | King et al. | |
| 5,818,992 A | | 10/1998 | Aloisio, Jr. et al. | |

OTHER PUBLICATIONS

W.W.King, et al, Plastic-Gap Attenuation, Proc. NFOEC 2001, pp. 742-751.

* cited by examiner

*Primary Examiner*—Daniel Stcyr
*Assistant Examiner*—Lisa M. Caputo
(74) *Attorney, Agent, or Firm*—Law Office of Leo Zucker; Michael A. Morra

(57) ABSTRACT

A fiber optic attenuating element is formed of a thermoplastic polymer having (i) a refractive index in the range of between about 1.42 and 1.47 as measured at a temperature of 23° C. and a wavelength of 1550 nm, (ii) a glass transition temperature of at least 105° C., and (iii) an intrinsic loss of less than one dB/mm at 1310 and 1550 nm. In disclosed embodiments, the polymer includes at least one monomer including fluorinated moieties and, optionally, one or more additional monomers. A main body portion of the element has a first planar contact face on a first side and a second planar contact face on a second, opposite side. The contact faces are dimensioned to couple optically with first and second optical fibers when ends of the fibers are urged against the faces by parts of an attenuator device in which the element is mounted.

29 Claims, 6 Drawing Sheets

MATERIAL A

| | wt.% MMA / wt.% TFEMA | R.I. at 589 nm | R.I. at 633 nm | R.I. at 1300 nm | R.I. at 1550 nm | Reflectance at 1550 nm (dB) | Tg (degrees C) |
|---|---|---|---|---|---|---|---|
| 1 | 80/20 | 1.475 | 1.474 | 1.465 | 1.464 | -45 | 118 |
| 2 | 70/30 | 1.469 | 1.467 | 1.460 | 1.459 | -50 | 105 |
| 3 | 64/36 | 1.464 | 1.462 | 1.454 | 1.453 | -54 | 105 |
| 4 | 60/40 | 1.462 | 1.459 | 1.452 | 1.449 | -56 | 107 |
| 5 | 55/45 | 1.456 | 1.454 | 1.447 | 1.445 | -51 | 107 |
| 6 | 50/50 | 1.454 | 1.451 | 1.444 | 1.443 | -49 | 100 |

Current attenuator element - PMMA type material

| | R.I. at 589 nm | R.I. at 633 nm | R.I. at 1300 nm | R.I. at 1500 nm | Reflectance at 1550 nm (dB) | Tg (degrees C) |
|---|---|---|---|---|---|---|
| PMMA | 1.508 | 1.507 | 1.497 | 1.496 | -36 | 128 |

FIG.4

MATERIAL B-PMFA

| | R.I. at 589 nm | R.I. at 633 nm | R.I. at 790 nm | R.I. at 1300 nm | R.I. at 1538 nm | R.I. at 1550 nm | Reflectance at 1550 nm (dB) | Tg (degrees C) |
|---|---|---|---|---|---|---|---|---|
| 1 | 1.459 | 1.457 | | 1.449 | | 1.448 | -52 | 142 |
| 2 | 1.459 | 1.454 | | 1.446 | | 1.445 | -52 | 142 |
| 3 | 1.459 | 1.458 | 1.454 | | 1.449 | | -51 | 142 |

Current attenuator element - PMMA type material

| R.I. at 589 nm | R.I. at 633 nm | R.I. at 790 nm | R.I. at 1300 nm | R.I. at 1538 nm | R.I. at 1550 nm | Reflectance at 1550 nm (dB) | Tg (degrees C) |
|---|---|---|---|---|---|---|---|
| 1.508 | 1.507 | | 1.497 | | 1.496 | -36 | 128 |

FIG.5

MATERIAL FOR ATTENUATING LIGHT SIGNALS WITH LOW REFLECTANCE IN A FIBER OPTIC NETWORK

CROSS REFERENCE TO RELATED APPLICATION

This application is a continuation-in-part of U.S. patent application Ser. No. 10/291,323 filed Nov. 9, 2002 now abandoned, and entitled "High Performance Fiber Optic Attenuator and Attenuating Element".

BACKGROUND OF THE INVENTION

1. Field of the Invention

The present invention relates to materials and components for attenuating light signals in a fiber optic network.

2. Discussion of the Known Art

Light sources are used in fiber optic systems or networks to produce light signals at desired wavelengths and power (intensity) levels. In some instances, however, the intensity of the light signals may be too high for sensitive optical receivers that are connected in the network physically close to the light sources. Accordingly, attenuators are inserted between the light sources and the receivers in order to maintain the received power levels within tolerable limits. Commercially available attenuator devices typically provide fixed values of attenuation, for example, 3 dB, 9 dB, 15 dB, or more. Precision variable attenuators are also available.

Attenuators in which an air gap of a determined length is defined between confronting end faces of two fibers, are known. In the absence of a light guide inside the gap, a light signal leaves the end face of the fiber on the transmission side, and spreads conically within the gap so that the intensity of the signal which remains to illuminate the end face of the confronting fiber is diminished by a desired amount. Because high reflections are produced at the interfaces between the end faces of the confronting fibers and the intervening air gap, a transparent polymeric disk may be inserted to fill the gap so as to reduce reflections and associated signal losses at the fiber end faces. See W. W. King, et al, Plastic-Gap Attenuation, Proceedings NFOEC (2001), at pages 742–51.

Attenuator devices should present as low a value of reflectance as possible when installed in fiber optic networks. Otherwise, light reflected at a transmission input of the device may reflect back to a laser light source and thus cause undesirable noise in the network. Polymeric disks or elements used in attenuator devices should therefore have a refractive index (R.I.) value that closely matches the R.I. of the cores of the associated fibers for the operating wavelength(s). Fiber cores have R.I.s of, e.g., about 1.44 to 1.46 (with a typical value of about 1.45). As is known in the art, the refractive index of the core of an optical fiber depends on the core's material properties and geometrical profile.

Reflectance produced at an interface between a given attenuating element and the core of a confronting fiber end face, is related to the difference between the refractive index of the attenuating element and that of the fiber core. For a step index optical fiber, this reflectance may be expressed as:

$$\text{Reflectance (in dB)} = -10 \log_{10}[f(n_{co}-n_p)^2/(n_{co}+n_p)^2 + (1-f)(n_{cl}-n_p)^2/(n_{cl}+n_p)^2]$$

wherein:

f is the relative fraction of guided power in the fiber core,
$n_{co}$ is the refractive index of the fiber core,
$n_{cl}$ is the refractive index of the fiber cladding,
$n_p$ is the refractive index of the attenuating element.

In general, the reflectance at an interface between materials of different refractive indices is given by:

$$\text{Reflectance (in dB)} = -10 \log_{10}[(n_{co}-n_p)^2/(n_{co}+n_p)^2]$$

For high speed networks, reflectance values lower than −45 dB are desirable with values less than −50 dB being preferred. Thus, the refractive index of any material that forms the attenuating element should be in the range of 1.420 to 1.470, and preferably in the range of 1.435 to 1.455, for light signal wavelengths of around 850 nanometers (nm) to 1620 nm, assuming the element is to be deployed with fibers whose core refractive index is typically about 1.45.

The body of a fixed attenuator is usually comprised of two mating connector parts, and each connector part has an axially aligned ferrule in which an associated fiber is contained so that an end face of the fiber is exposed at a distal end of the ferrule. An attenuating element is supported inside the attenuator body so that opposite sides of the element are aligned with the end faces of the fibers, and the fiber end faces are urged by the associated ferrules into contact with both sides of the element when the connector parts are joined to one another. The attenuating element is thus placed in a state of compression, and it should be able to resist deformation over a range of temperatures likely to be encountered during operation. Attenuators must perform reliably at elevated temperatures, typically up to 75 degrees C. under certain test conditions. At high transmission power levels (e.g., around 20 dBm), surface temperatures on the attenuating element may in fact rise to as much as 90 degrees C.

Attenuating elements made of thermoplastic materials also must resist deformation under load, i.e., "creep", for long periods of time. Polymeric thermoplastic materials usually do resist both creep and short term deformation, provided the operating temperature is at least 10 to 15 degrees C. below a so-called glass transition temperature (Tg) of the material. Tg is defined as the temperature at which an amorphous or semi-crystalline polymer softens due to the onset of long-range coordinated molecular motion. When producing attenuating elements, it is therefore desirable to specify materials having a Tg greater than about 105 degrees C., and preferably at least 110 degrees C.

Polymeric thermoplastic attenuating elements currently known to be used in fiber optic networks have one or both of the following limitations:

1. The elements exhibit a reflectance that is higher than −40 dB (i.e., the difference in R.I. between the element and the cores of the associated fibers is greater than 0.03); and 2. The elements cannot resist deformation under load at normal service temperatures, or at elevated temperatures that result when high power light signals become incident on the element (i.e., the Tg of the material is too low).

U.S. Pat. No. 5,082,345 (Jan. 21, 1992) describes an attenuating element made from polymethylmethacrylate (PMMA). The material has a refractive index of 1.4900 ($n^{20}_D$) which produces, at best, a reflection of −40 dB. The term ($n^{20}_D$) connotes that the refractive index was measured at 20 degrees C. using a Na-D light source having a wavelength of 589 nm.

U.S. Pat. No. 5,619,610 (Apr. 8, 1997) discloses an optical terminating element made of a copolymer of propylene and 4-methyl-1-pentene. The refractive index of the copolymer is 1.463 ($n^{20}_D$), and it obtains a reflection of −50 dB. But the Tg of the material is only 25 degrees C. Therefore, the copolymer is not suitable for use as an attenuating element at temperatures likely to be encountered during operation. See also U.S. Pat. No. 5,818,992 (Oct. 6, 1998) which discloses an optical terminating element made of PMMA and having a Tg greater than 80 degrees C.

U.S. Pat. No. 5,073,615 (Dec. 17, 1991) relates to a heat resistant methacrylate-maleimide copolymer having a Tg of between 105° C. and 131° C. Fiber optic attenuating elements formed of the copolymer (also known as "Acritherm" (tm)) exhibit a relatively high reflectance of typically around −35 dB, however. As noted above, the high reflectance is a result of a mismatch between the index of refraction of the element and the index of refraction of the fiber cores that contact the element. The index of refraction of the element is, in turn, determined by the inherent electronic configuration of its molecules, i.e., the methylmethacrylate (MMA)-imide copolymers that comprise the element. In other words, the R.I. of the element cannot be changed significantly and permanently without changing the element's chemical formulation. See also, U.S. Pat. No. 5,319,043 (Jun. 7, 1994).

In view of the known state of the art, there is a need for an attenuating element that exhibits a reflection of less than −45 dB, a Tg of at least 105 degrees C., and which has insignificant intrinsic loss, i.e., a relatively high transmissivity at the desired operating wavelengths.

SUMMARY OF THE INVENTION

According to the invention, an element for attenuating light signals in a fiber optic network has a main body portion formed of a thermoplastic polymer, and the main body portion has (i) a refractive index in the range of between about 1.420 and 1.470 and preferably between 1.435 and 1.455, as measured at a temperature of 23° C. and a wavelength of 1550 nm, (ii) a glass transition temperature of at least 105° C., and (iii) an intrinsic loss of less than one dB/mm at wavelengths of 1310 nm and 1550 nm.

According to another aspect of the invention, an element for attenuating light signals in a fiber optic network has a main body portion formed of a thermoplastic polymer having at least one monomer that includes fluorinated moieties and, optionally, one or more additional monomers, wherein the main body portion has (i) a refractive index in the range of between about 1.42 and 1.47 and preferably between 1.435 and 1.455, as measured at a temperature of 23° C. and a wavelength of 1550 nm, (ii) a glass transition temperature of at least 105° C., and (iii) an intrinsic loss of less than one dB/mm at wavelengths of 1310 nm and 1550 nm.

According to another aspect of the invention, an element for attenuating light signals in a fiber optic network has a main body portion formed of a thermoplastic polymer comprising fluorine in an amount between about 5 wt. % and 30 wt. %, and preferably between 10 wt. % and 25 wt. %, wherein the main body portion has (i) a refractive index in the range of between about 1.42 and 1.47, and preferably between 1.435 and 1.455, as measured at a temperature of 23° C. and a wavelength of 1550 nm, (ii) a glass transition temperature of at least 105° C., and (iii) an intrinsic loss of less than one dB/mm at wavelengths of 1310 nm and 1550 nm.

According to a further aspect of the invention, an element for attenuating light signals in a fiber optic network has a main body portion formed of a polymer including methylmethacrylate (MMA) and trifluoroethylmethacrylate (TFEMA), wherein the main body portion has a refractive index in the range of between about 1.42 and 1.47, and preferably between 1.435 and 1.455, as measured at a temperature of 23° C. and a wavelength of 1550 nm, and has a glass transition temperature (Tg) of at least 105° C.

According to another aspect of the invention, an element for attenuating light signals in a fiber optic network has a main body portion formed of a polymer consisting essentially of polymethyl-2-fluoroacrylate (PMFA), wherein the main body portion has a refractive index in the range of between about 1.42 and 1.47, and preferably between 1.435 and 1.455, as measured at a temperature of 23° C. and a wavelength of 1550 nm, and has a Tg of at least 105° C.

According to a further aspect of the invention, an element for attenuating light signals in a fiber optic network includes a main body portion formed of a polymer consisting essentially of methylmethacrylate (MMA), trifluoroethylmethacrylate (TFEMA), and a monomer selected from the group comprising maleimide, N-methyl-maleimide, N-ethylmaleimide, N-phenylmaleimide, and N-cyclohexylmaleimide, wherein the main body portion has a refractive index in the range of between about 1.42 and 1.47, and preferably between 1.435 and 1.455, as measured at a temperature of 23° C. and a wavelength of 1550 nm, and has a Tg of at least 105° C.

According to another aspect of the invention, an element for attenuating light signals in a fiber optic network includes a main body portion formed of a polymer consisting essentially of methylmethacrylate (MMA) and one or more monomers selected from the group comprising hexafluoroisopropyl methacrylate (HFIPMA) and perfluorocyclohexyl methylmethacrylate (PFCHMMA), and, optionally, one or more monomers selected from the group comprising maleimide, N-methyl-maleimide, N-ethylmaleimide, N-phenylmaleimide and N-cyclohexylmaleimide, wherein the main body portion has a refractive index in the range of between about 1.42 and 1.47, and preferably between 1.435 and 1.455, as measured at a temperature of 23° C. and a wavelength of 1550 nm, and has a Tg of at least 105° C.

For a better understanding of the invention, reference is made to the following description taken in conjunction with the accompanying drawing and the appended claims.

BRIEF DESCRIPTION OF THE DRAWING

In the drawing:

FIG. 4 is a table comparing performance characteristics for an optical attenuator element made from MMA/TFEMA copolymer according to the invention, with those of a known attenuating element;

FIG. 5 is a table comparing performance characteristics for an optical attenuator element made from PMFA polymer according to the invention, with those of a known attenuating element.

DETAILED DESCRIPTION OF THE INVENTION

Figure 1:
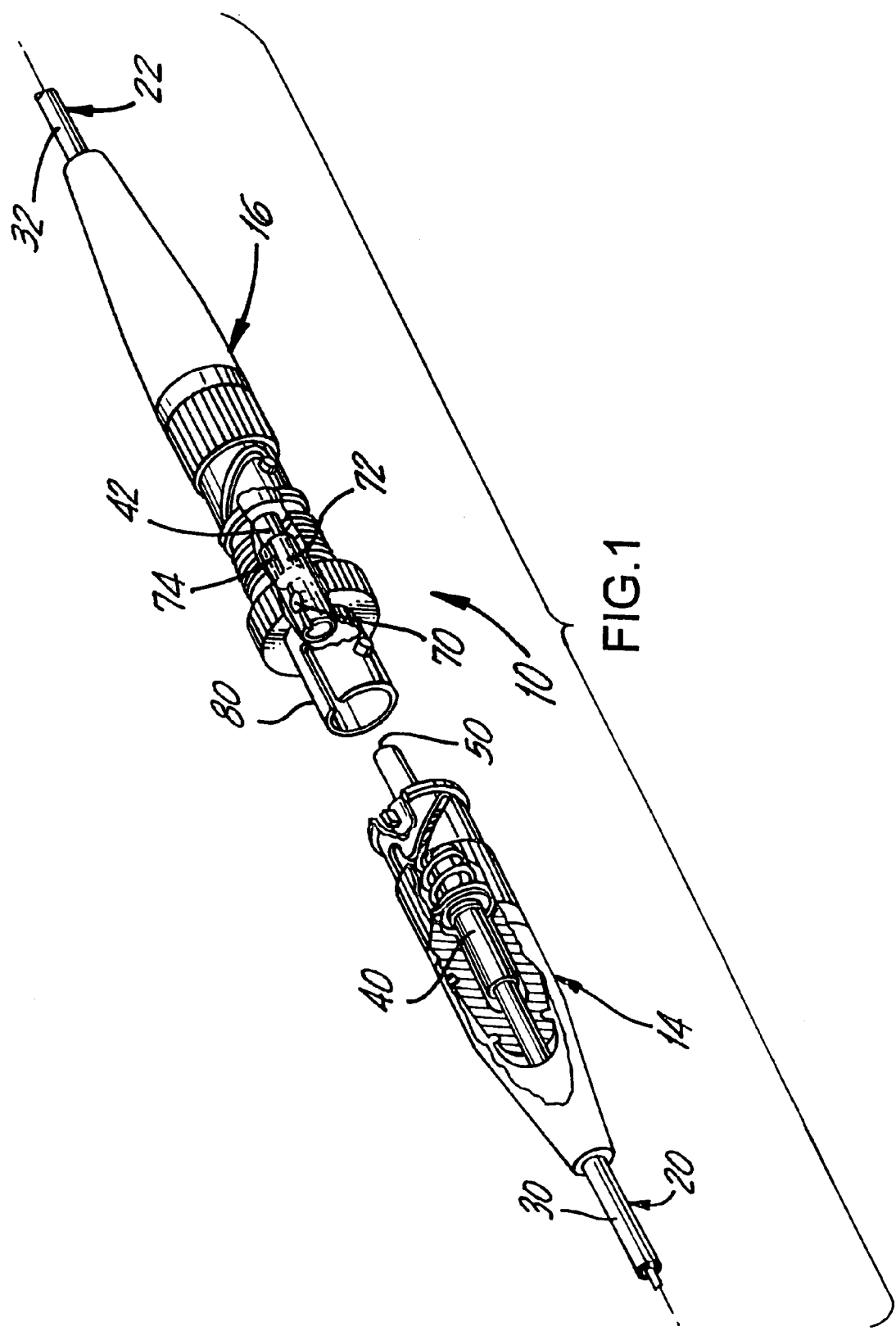
FIG. 1 is a perspective, assembly view with parts broken away, showing a fiber optic attenuator having an attenuating element according to the invention.
Figure 2:
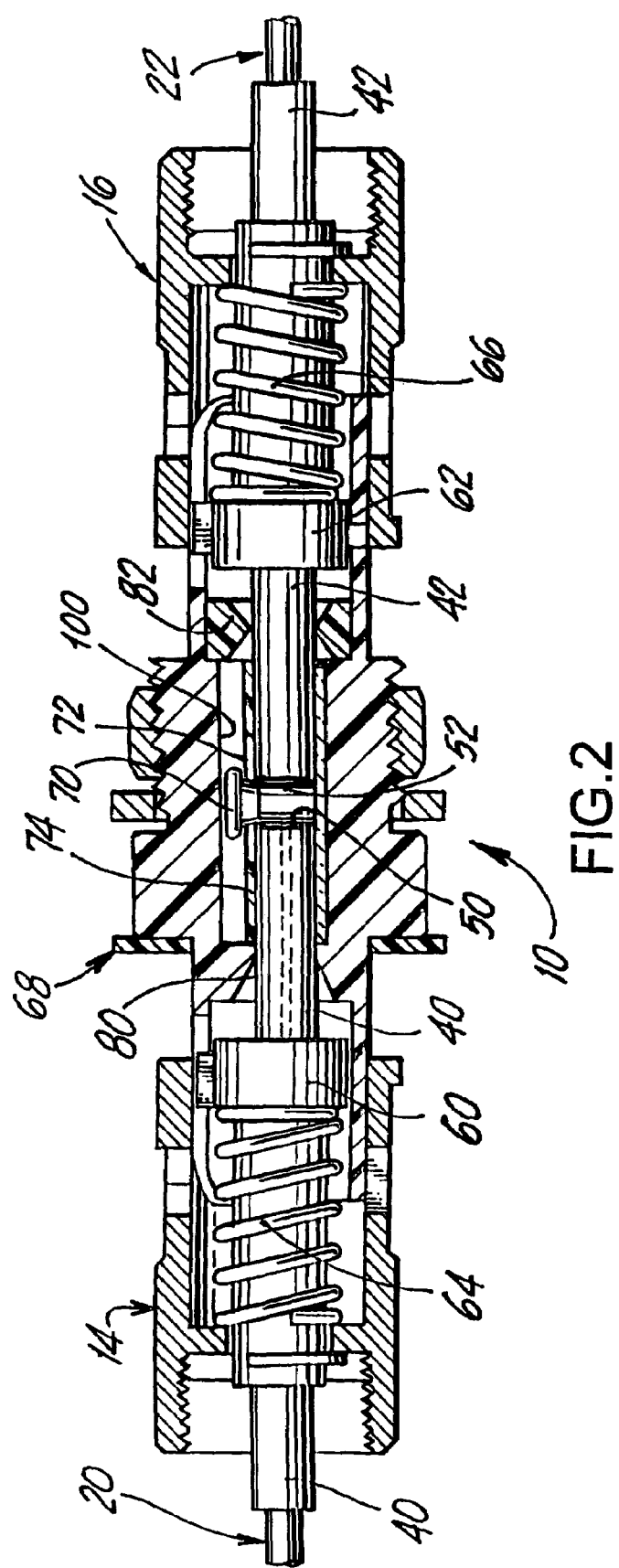
FIG. 2 is a cross sectional view taken along the direction of an axis of the attenuator of FIG. 1, and showing the attenuator in an assembled state.

FIGS. 1 and 2 show details of a component fiber optic attenuator 10, including an attenuating element 70 (see FIG. 3) that is formed of a material according to the invention. The body of the attenuator 10 may be constructed the same as or similar to the structure disclosed in, for example, U.S. Pat. No. 5,082,345 (Jan. 21, 1992). All relevant portions of the '345 patent are incorporated by reference.

In the illustrated embodiment, the attenuator 10 includes first and second elongated fiber optic plug assemblies 14, 16. The assemblies 14, 16 are constructed to receive exposed end portions of first and second optical fibers 20, 22, and to secure the fiber end portions in axial alignment within the plug assemblies. Typically, the fibers 20, 22 have outer jackets 30, 32 made of PVC and/or other material for protectively surrounding the fiber cladding and core. Accordingly, the outer jackets 30, 32 are first removed from the end portions of the fibers 20, 22, and the exposed fiber end portions are then inserted through axial passageways of corresponding ferrules 40, 42 which are mounted coaxially inside the two plug assemblies 14, 16. When the plug assemblies are joined as explained below, confronting distal ends of the ferrules 40, 42 are brought into axial alignment with one another. Planar end faces 50, 52 are cleaved and polished on the end portions of the fibers at the distal ends of the ferrules 40, 42.

The ferrules 40, 42 are supported coaxially within corresponding cylindrical jackets 60, 62 for sliding movement inside the plug assemblies 14, 16. The jackets 60, 62 are biased by associated coil springs 64, 66 mounted on the circumference of the jackets, so that the distal ends of the ferrules 40, 42 together with the end faces 50, 52 of two fibers are biased to project axially from the distal ends of the plug assemblies 14, 16.

In the disclosed embodiment, the body of the fiber optic attenuator 10 also includes a generally cylindrical coupling assembly 68 within which the attenuating element 70 formed of a material according to the invention is operatively disposed. The coupling assembly 68 has a sleeve 72 that extends coaxially within the assembly, and the sleeve 72 has a longitudinal slot 74 in its circumference over the entire length of the sleeve. The coupling assembly 68 also has two axially aligned and oppositely facing cylindrical connecting members 80, 82. The connecting members 80, 82 are constructed and arranged to engage and connect with corresponding connecting members 84, 86 on the plug assemblies 14, 16.

Figure 3:
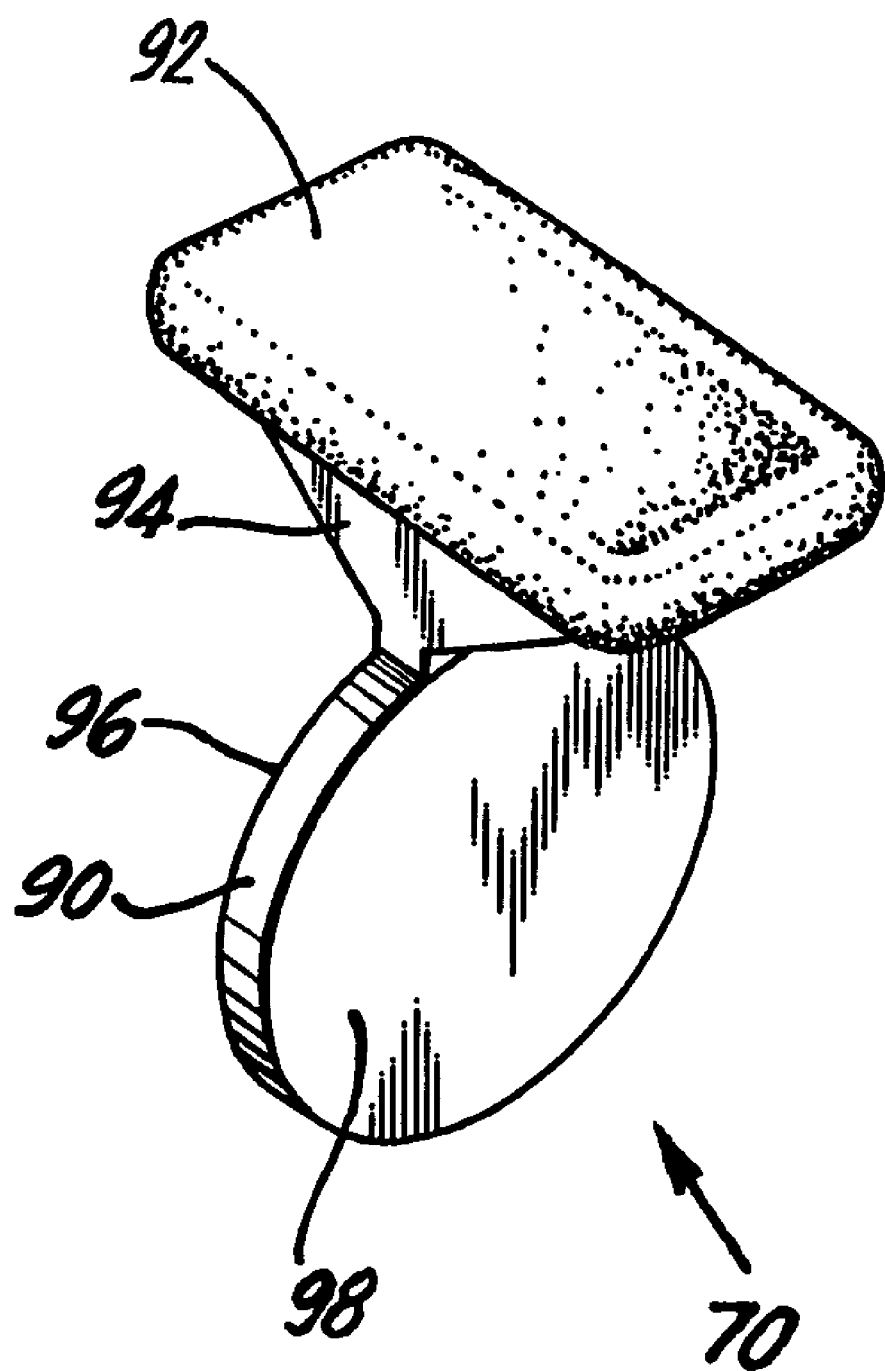
FIG. 3 is a perspective view of an attenuating element formed of a material according to the invention.

The optical attenuating element 70 is of a form which may be the same or similar to that shown in FIG. 3. A main body portion 90 of the element 70 is generally disc shaped, and has a thickness that corresponds to a desired degree of attenuation to be provided between the end faces 50, 52 of the fibers 20, 22 in FIGS. 1 and 2. The main body portion 90 has two oppositely facing planar end faces 96, 98 which are formed and dimensioned to contact and to couple optically with the end faces 50, 52 of the first and the second fibers 20, 22 in FIGS. 1 and 2.

The element 70 also has a head portion 92 that is joined to its body portion 90 through a neck 94 that extends radially from the circumference of the body portion 90. The thickness of the neck is such as to enable it to be received and to slide freely within the slot 74 of the coupling assembly sleeve 72, so that the main body portion 90 of the element can assume an operating position along the axis of the sleeve 72 as the element end faces 96, 98 contact the end faces 50, 52 of the fibers 20, 22 once the plug assemblies 14, 16 are connected to the coupling assembly 68. The head portion 92 of the attenuating element 70 has, in the disclosed embodiment, a generally rectangular configuration that enables it to be captured for movement within a channel 100 (see FIG. 2) that is formed in the body of the coupling assembly 68, adjacent to the longitudinal slot 74 in the sleeve 72.

Once the main body portion 90 of the attenuating element 70 is placed inside the coupling assembly sleeve 72, the plug assemblies 14, 16 are mated to the corresponding connecting members 80, 82 of the coupling assembly 68. The end faces 50, 52 on the fibers 20, 22 which are disposed at the distal ends of the ferrules 40, 42, are then urged via the bias springs 64, 66 against the end faces 96, 98 of the attenuating element 70.

It has been discovered that if the main body portion 90 of the attenuating element 70 is formed of certain materials such as described below, fixed values of attenuation may be obtained for the attenuator 10 ranging from, e.g., about 0.5 to 20 or more dB with a reflection less than −40dB, a Tg greater than 105 degrees C., and an intrinsic loss of less than 1 dB/mm at wavelengths of 1310 nm and 1550 nm.

EXAMPLE 1

Attenuating Element Material A

A thermoplastic material for the element 70 was synthesized as a copolymer of methyl methacrylate (MMA) and trifluoroethylmethacrylate (TFEMA), with a molecular weight in the range of about 20,000 to 500,000. The relative composition of MMA and TFEMA was in the range of about 50/50 to about 90/10 (MMA/TFEMA wt. %/wt. %). The composition is the relative proportion of the two comonomers—MMA and TFEMA—that were added together in the reaction to yield the copolymer. The copolymer material may be synthesized using a free radical polymerization method in bulk, solution, or emulsion. See, for example, C. U. Pittman, et al, Journal of Polymer Science, Polymer Chemistry Edition, vol. 18 (12) (1980) at pages 3413–25 which are incorporated by reference.

The table of FIG. 4 shows the refractive index, the measured reflectance and the Tg of material A at various operating wavelengths, as compared to a Polymethylmethacrylate (PMMA) type material that is currently used for attenuating elements.

Further, insertion loss measurements were made on a sample element formed of the material A before and after exposing the element for 60 hours to a laser light source at a wavelength of 1550 nm and a high power of 23 dBm. The measured insertion loss prior to exposure to the high power was 20 dB, and the change in insertion loss after exposure to the high power was less than 0.5 dB. The element was also viewed under magnification for signs of visible damage, with none being found.

Elements formed of the material A having the compositions (wt. % MMA/wt. % TFEMA) shown in the table of FIG. 4, all exhibit the following desirable characteristics:

a. A refractive index value in the range 1.42 to 1.48 in the wavelength range of 589 nm to 1550 nm. The refractive index can be controlled by varying the relative proportions of MMA and TFEMA in the copolymer. This property allows the element to have a reflectance of −40 dB or lower at wavelengths of from 850 nm to 1620 nm.

b. A measured reflectance that is lower than −40 dB at 1550 nm. A specific case (wt. % MMA/wt. % TFEMA=60/40) achieves a reflectance that is less than −55 dB at a wavelength of 1550 nm.

c. A Tg that is greater than 100 degrees C., and resistance to deformation under load at operating temperatures of up to 85 degrees C.

EXAMPLE 2

Attenuating Element Material B

The element 70 was formed of polymethyl-2-fluoroacrylate (PMFA), a polymer which may be synthesized from methyl-2-fluoroacrylate monomer by a free radical polymerization method in bulk, solution or emulsion. Such methods are described in, for example, C. U. Pittman, et al, Macromolecules, vol. 13 (1980), at pages 1031–36 which are incorporated by reference.

The table of FIG. 5 shows the refractive index, the measured reflectance and the Tg of material B at various operating wavelengths, as compared to the known Polymethylmethacrylate (PMMA) type material currently used for attenuator elements.

Further, insertion and return loss measurements were made on two sample elements formed of material B after exposure to a laser light source at a wavelength of 1550 nm and a high power level of 30.6 dBm (i.e., approx. 1 watt).

Sample 1 was formed so that the main body portion 90 of the element was sufficiently thin to provide a measured insertion loss of 3.3 dB. The measured return loss (reflectance) for sample 1 was −45.62 dB. The sample was also viewed under magnification for signs of visible damage, with none being found.

Sample 2 was thicker than sample 1, and measured 2.5 mm both before and after the high power tests with no noticeable difference. The sample was also viewed under magnification for signs of visible damage, with none being found. The measured insertion loss for sample 2 was 23.52 dB, and the measured return loss was −50.10 dB.

Elements formed of the material B all exhibit the following desirable characteristics:

a. A refractive index in the range of 1.44 to 1.46 at wavelengths from 589 nm to 1550 nm. This property allows the element to have a reflectance of −50 dB or lower in the wavelength range of 850 nm to 1620 nm.

b. A measured reflectance better than −50 dB at a wavelength of 1550 nm.

c. A Tg that is greater than 140 degrees C., and resistance to deformation under load at operating temperatures of up to 125 degrees C.

Both of the element materials A and B are polymeric thermoplastic materials that can be fabricated in the form of the attenuating element 70 using known injection or compression molding techniques. Manufacturing costs for the element 70 are therefore lower than those which would result if the element 70 were formed of glass or ceramics.

The refractive index of both materials A and B closely matches that of typical optical fiber cores, i.e., the R.I. of either material A or B is within the range of 1.42 to 1.48 at wavelengths of from 589 nm to 1620 nm, thus realizing an element reflectance of less than −40 dB.

The Tg of both materials A and B is greater than 100 degrees C. Therefore, when formed of either material, the element 70 is resistant to creep at operating temperatures. Both materials resist deformation under normal service loads at ambient temperatures. Material A resists deformation under normal service loads at temperatures of up to 85 degrees C., and material B resists deformation under normal loads up to 125 degrees C.

EXAMPLE 3

It has been discovered that a third component may be added to the MMA/TFEMA formulation of Example 1 to increase the Tg of the material, while retaining favorable optical properties. The third component has a non-aromatic cyclic structure to stiffen the chain without significantly changing the electronic configuration of the backbone, thus minimally altering the refractive index of the resulting material. It is possible, however, to employ an aromatic structure provided there is enough low-index component (e.g. fluorinated monomer) to compensate for the higher index of the aromatic group. For example, any one of several imides disclosed in the above-mentioned U.S. Pat. No. 5.073,615 including maleimide, N-methylmaleimide, N-ethyl-maleimide, N-phenylmaleimide, or N-cyclohexyl-maleimide, may be added to elevate the glass transition temperature of the material A of Example 1.

Figure 6:
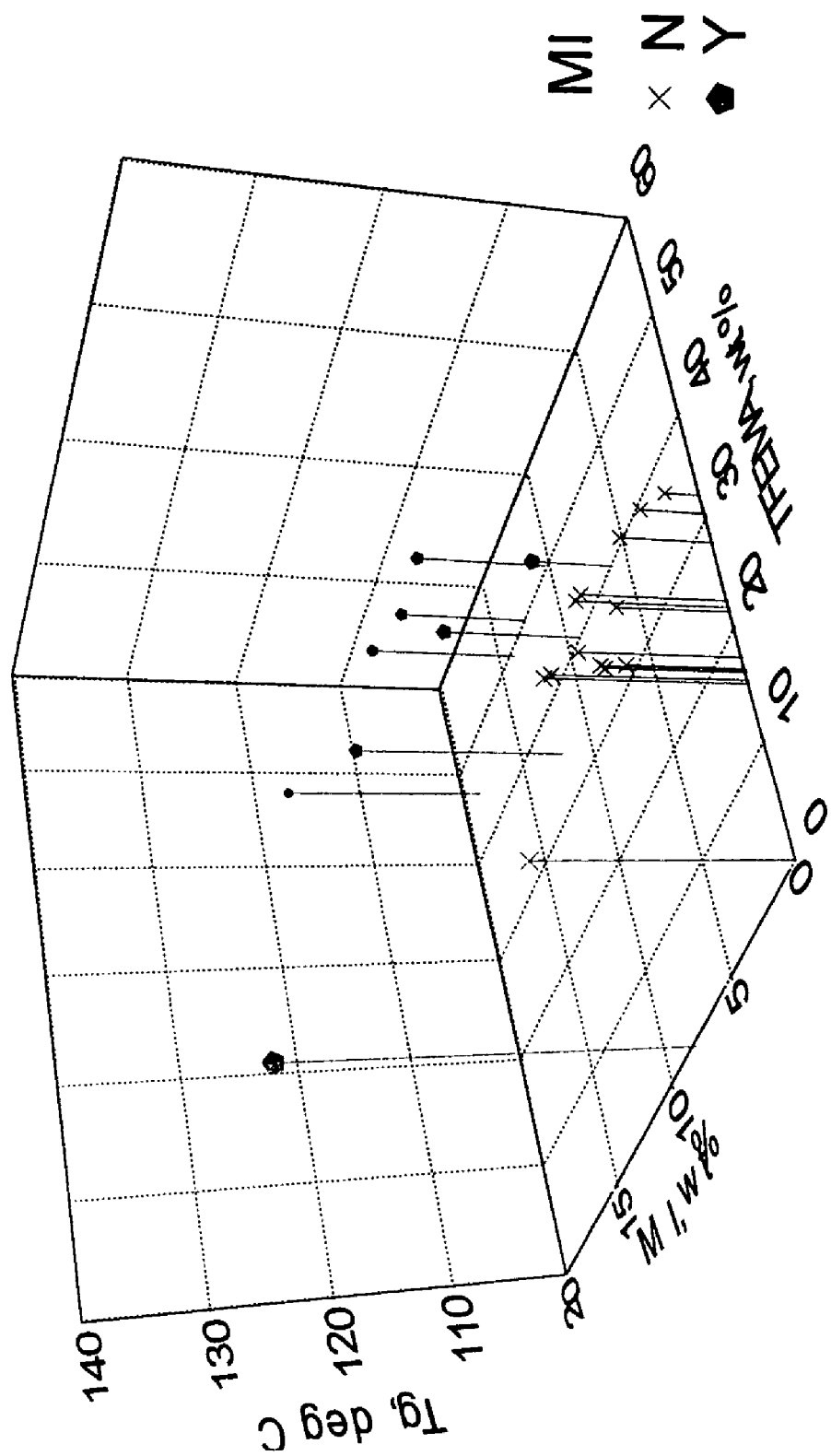
FIG. 6 is a 3-D representation of glass transition temperature (Tg) for an attenuating element having various weight percentages of TFEMA and maleimide.

Preferred compositions of the resulting terpolymer include TFEMA in the range of 20 to 60 weight %, MMA in the range of 30 to 80 weight %, and imide in the range of 2 to 30 weight %. The following Table I shows results obtained for various weight proportions of TFEMA and MMA alone, and with the addition of maleimide. See also FIG. 6.

TABLE I

| TFEMA wt % | MMA wt % | Maleimide wt % | Tg ° C. |
|---|---|---|---|
| 0 | 100 | 0 | 120 |
| 0 | 92 | 8 | 132.5 |
| 32 | 68 | 0 | 103 |
| 40 | 54 | 6 | 107 |
| 30.3 | 69.7 | 0 | 105.4 |
| 27.6 | 72.4 | 0 | 107.6 |
| 22.3 | 77.7 | 0 | 111.8 |
| 21.7 | 78.3 | 0 | 112.3 |
| 21.3 | 78.7 | 0 | 109.2 |
| 17.3 | 82.7 | 0 | 113 |
| 16.2 | 83.8 | 0 | 111.5 |
| 16.3 | 83.7 | 0 | 109.5 |
| 16 | 84 | 0 | 111.2 |
| 15.3 | 84.7 | 0 | 115.4 |
| 15 | 85 | 0 | 116 |
| 50.4 | 39.4 | 10.2 | 112 |
| 49.9 | 37.7 | 12.4 | 112 |
| 44.9 | 36.5 | 18.6 | 118 |
| 49.1 | 37.2 | 13.7 | 113 |
| 32.5 | 29.1 | 38.4 | 121 |

As shown in Table I, samples including maleimide generally obtain higher Tgs than those without. Further, the refractive index of the fourth sample containing 6% MI measured about 1.447, thus providing a light attenuating material having a very low reflectance of about −55 dB and a Tg of 107° C.

Table II, below, shows results for sample materials having various proportions (by weight %) of MMA and TFEMA alone, and combined with stated weight percentages of maleimide (MI), hexafluoroisopropyl methacrylate (HFIPMA), and perfluorocyclohexyl methyl-methacrylate (PFCHMMA). When combined with MMA, either HFIPMA or PFCHMMA enables the resulting material to exhibit a higher Tg than TFEMA. Advantageously, less of either HFIPAM or PFCHMMA is needed to form the copolymer material since either monomer has more fluorine per gram than TFEMA. In the table, the first column is a formulation number, the next five columns are weight percentages of the constituent monomers, the next column is refractive index as measured at 1550 nm, the next column shows weight percent of fluorine, and the last two columns are Tg in degrees C. as measured in two successive passes (Tg1 and Tg2) using a modulated differential scanning calorimeter (DSC) with a three degree C. per minute ramp rate. The amplitude of the modulation was one degree C., and the frequency was 60 seconds. The Tg was measured at the inflection point of a transition. Refractive index measurements were made using a Metricon prism coupler.

Assume a target refractive index (R.I.) of about 1.446 to obtain least reflectance. Even though formulation (FSO) 50A has such a R.I., formulations 53, 56 and 60-2A with R.I.s of 1.447, 1.445 and 1.445, respectively, are nonetheless preferred since they exhibit higher Tgs (especially on the $2^{nd}$ pass) than does FSO 50A. In Table II, FSO A1 is "Acritherm" material from supplier "1", and A2 is "Acritherm" from supplier "2".

fluorine content is between 10 wt. % and 25 wt. %, although a wider range of from about 5 wt. % to about 30 wt. % fluorine may be acceptable depending on the application.

f) Depending on the specific fluorinated monomer chosen, an additional non-fluorinated monomer may be needed to tailor an appropriate refractive index and glass transition temperature, subject to the aforementioned factors.

g) Additional monomers with rigid cyclic or multicyclic moieties may be desirable to increase the glass transition temperature.

h) The specific polymers synthesized for the examples herein have either one monomer (homopolymers), two monomers (copolymers), or three monomers (ter-polymers). These examples were chosen for simplicity. Nonetheless, the present invention also contemplates the use of multi-component polymers containing four or more monomers. Three more examples of suitable monomers and monomer family combinations that can be used to form the inventive fiber optic attenuating element, are given below.

EXAMPLE 4

(a) 7% to 100% by weight (based on the total thermoplastic composition) of one or more monomers selected

TABLE II

| Sample ID | MMA | TFEMA | MI | HFIPMA | PFCHMMA | RI @ 1550 | Fluorine wt. % | Tg (1) (C) | Tg 2 (C) |
|---|---|---|---|---|---|---|---|---|---|
| FSO 50 | 37.9 | 54 | 8.1 | | | 1.447 | 17.22 | 113 | 107 |
| FSO 53 | 39.4 | 50.3 | 10.3 | | | 1.447 | 17.75 | 114 | 109 |
| FSO 54 | 37.4 | 50.3 | 12.3 | | | 1.45 | 17.04 | 119 | 117 |
| FSO A1 | 100 | 0 | 0 | | | 1.501 | | 122 | |
| FSO A2 | 100 | 0 | 0 | | | 1.497 | | 122 | |
| FSO 38 | 73.8 | 26.2 | | | | 1.455 | 12.69 | 113 | 106.5 |
| FSO 49 | 67.5 | 32.5 | | | | 1.451 | 15.19 | 111 | 104 |
| FSO 50A | 37.9 | 54 | 8.1 | | | 1.4456 | 18.3 | 113 | 107 |
| FSO 52 | 90 | 0 | 10 | | | 1.486 | 0.1 | 139 | 132 |
| FSO 55 | 80 | | | | 20 | 1.451 | 15.92 | 124 | 118 |
| FSO 56 | 84.2 | | | 15.8 | | 1.445 | 14.8 | 119 | 111 |
| FSO 57 | 80 | | | 20 | | 1.437 | 18.16 | 116 | 107 |
| FSO 59 | 77.1 | | 5 | 17.8 | | | 16.34 | 116 | 110 |
| FSO 56 1A | 85.8 | | | 14.2 | | 1.4515 | 13.54 | 112.5 | 108.6 |
| FSO 56 1B | 86.1 | | | 13.9 | | 1.4512 | 13.34 | 115.6 | 107.9 |
| FSO 60 1A | 37.7 | 49.9 | 12.4 | | | 1.438 | 21.28 | 112.8 | 111.3 |
| FSO 60 0A | 39.4 | 50.4 | 10.2 | | | 1.437 | 21.42 | 116.6 | 111.5 |
| FSO 60 1B | 36.5 | 44.9 | 18.6 | | | 1.451 | 19.68 | 118.02 | 118.08 |
| FSO 60 2A | 37.2 | 49.1 | 13.7 | | | 1.445 | 21.21 | 114.7 | 113.1 |
| FSO 60 2B | 29.1 | 32.5 | 38.4 | | | | 15.27 | 121 | 105 |

The results obtained demonstrate that a number of different monomer combinations may produce an attenuating element material within the scope of the present invention. Important factors are:

a) The monomers should easily polymerize or co-polymerize to form a transparent thermoplastic polymer. Transmission characteristics are detailed further below.

b) The glass transition temperature of the polymer should at least equal or exceed 105 C., and preferably 110 C., in order to provide reliability and dimensional stability.

c) The refractive index should be between 1.42 and 1.47 (as measured at a temperature of 23° C. and a wavelength of 1550 nm), although more stringent applications may require an index of between 1.435 and 1.455.

d) At least one fluorinated monomer is needed so as to obtain a lower refractive index than that achievable with non-fluorinated thermoplastic polymers, whose refractive indices are higher than that of a silica-based optical fiber.

e) The refractive index of the polymer may be correlated to the total fluorine content. From Table II, an optimum from the group consisting of fluorinated acrylates, fluorinated methacrylates, 2-fluoroacrylates, 2-(trifluoromethyl) acrylates, cyclically polymerized perfluoroalkenyl vinyl ethers; fluorinated dioxoles; fluorinated dioxolanes, and fluorinated styrenes; wherein each monomer comprises from 4 to 16 carbon atoms and from 15 wt. % to 71 wt. % fluorine;

(b) 0 to 93% by weight of one or more monomers selected from the group consisting of acrylates, methacrylates, acrylamides, methacrylamides, styrene, and substituted styrenes, wherein each monomer comprises from 3 to 20 carbon atoms; and (c) 0 to 50% by weight of one or more monomers selected from the group consisting of vinyl ethers, alkenyl ethers, maleic acid, maleic anhydride, maleates, substituted maleic acids, substituted maleic anhydrides, maleimides, substituted maleimides, alkenyl oxazolines, acroleins, acenaphtylenes, phenylacetylenes, N-vinyl-carbazoles, substituted citraconomides, itaconamates, itaconates, fumarates, itaconimides, vinyl phosphonates, substituted vinyl pyridazinones, vinyl pyridine, substituted vinyl pyridines, N-vinyl-pyrrolidone, subsituted pyrrolidones, substituted vinyl tetrazoles, substituted vinyl triazoles, olefins, and halogenated olefins; wherein each monomer comprises from 2 to 20 carbon atoms.

EXAMPLE 5

(a) 7% to 100% by weight (based on the total thermoplastic composition) of one or more monomers selected from the group consisting of methyl α-fluoroacrylate (also known as methyl 2-fluoroacrylate); 2,2,2-trifluoroethyl α-fluoroacrylate; 2,2,3,3-tetrafluoropropyl α-fluoroacrylate; 2,2,3,3,3-pentafluoropropyl α-fluoroacrylate; 2,2,3,3,4,4-hexafluorobutyl α-fluoroacrylate; 2,2,3,3,4,4,4-heptafluorobutyl α-fluoroacrylate; perfluoro-tert-butyl α-fluoroacrylate; 1-trifluoromethyl-2,2,3,3,-tetrafluoropropyl α-fluoroacrylate; 1-trifluoromethyl-2,2,3,3,3-pentafluoropropyl α-fluoroacrylate; 1,1-dimethyl-2,2,3,3-tetrafluoropropyl α-fluoroacrylate; 1,1-dimethyl-2,2,3,3,3-pentafluoropropyl α-fluoroacrylate; 2,2,3,3,4,4,5,5-octafluoropentyl α-fluoroacrylate; 2,2,3,3,4,4,5,5,5-nonafluoropentyl α-fluoroacrylate; 1,1,1,3,3,3-hexafluoroisopropyl α-fluoroacrylate, 2-trifluoromethyl-2,3,3,3-tetrafluoropropyl α-fluoroacrylate; 2,2-bis(trifluoromethyl)-3,3,3-trifluoropropyl α-fluoroacrylate; perfluorocyclohexylmethyl α-fluoroacrylate; perfluoroisobornyl α-fluoroacrylate; pentafluorophenyl α-fluoroacrylate, pentafluorobenzyl α-fluoroacrylate; 2-(perfluorobutyl)ethyl α-fluoroacrylate; 2-(perfluoro-3-methylbutyl)ethyl α-fluoroacrylate; heptafluoroisopropyl α-fluoroacrylate; hexafluoro-2-methylisopropyl α-fluoroacrylate; 3-(perfluorobutyl)-2-hydroxypropy α-fluoroacrylate; 2,2,3,3,4,4,5,5,6,6,7,7-dodecafluoroheptyl α-fluoroacrylate; 2,2,3,3,4,4,5,5,6,6,7,7,7-tridecafluoroheptyl α-fluoroacrylate; 2,2,3,3,4,4,5,5,6,6,7,7,8,8,8-pentadecafluorooctyl α-fluoroacrylate; 3,3,4,4,5,5,6,6,7,7,8,8-tridecafluorooctyl α-fluoroacrylate; 3-(perfluoro-5-methylhexyl)-2-hydroxypropyl α-fluoroacrylate; 3-(perfluoro-7-methyloctyl)-2-hydroxypropyl α-fluoroacrylate; 3-(perfluorooctyl)-2-hydroxypropyl α-fluoroacrylate; perfluoroalkyl sulfonamido α-fluoroacrylate; methyl 2-(trifluoromethyl)acrylate; tert-butyl 2-(trifluoromethyl)acrylate; 2,2,2-trifluoroethyl methacrylate; 2,2,3,3-tetrafluoropropyl methacrylate; 2,2,3,3,3-pentafluoropropyl methacrylate; 2,2,3,3,4,4-hexafluorobutyl methacrylate; 2,2,3,3,4,4,4-heptafluorobutyl methacrylate; perfluoro-tert-butyl methacrylate; 1-trifluoromethyl-2,2,3,3,-tetrafluoropropyl methacrylate; 1-trifluoromethyl-2,2,3,3,3-pentafluoropropyl methacrylate; 1,1-dimethyl-2,2,3,3-tetrafluoropropyl methacrylate; 1,1-dimethyl-2,2,3,3,3-pentafluoropropyl methacrylate; 2,2,3,3,4,4,5,5-octafluoropentyl methacrylate; 2,2,3,3,4,4,5,5,5-nonafluoropentyl methacrylate; 1,1,1,3,3,3-hexafluoroisopropyl methacrylate, 2-trifluoromethyl-2,3,3,3-tetrafluoropropyl methacrylate; 2,2-bis(trifluoromethyl)-3,3,3-trifluoropropyl methacrylate; perfluorocyclohexylmethyl methacrylate; perfluoroisobornyl methacrylate; pentafluorophenyl methacrylate, pentafluorobenzyl methacrylate; 2-(perfluorobutyl)ethyl methacrylate; 2-(perfluoro-3-methylbutyl)ethyl methacrylate; heptafluoroisopropyl methacrylate; hexafluoro-2-methylisopropyl methacrylate; 3-(perfluorobutyl)-2-hydroxypropyl methacrylate; 2,2,3,3,4,4,5,5,6,6,7,7-dodecafluoroheptyl methacrylate; 2,2,3,3,4,4,5,5,6,6,7,7,7-tridecafluoroheptyl methacrylate; 2,2,3,3,4,4,5,5,6,6,7,7,8,8,8-pentadecafluorooctyl methacrylate; 3,3,4,4,5,5,6,6,7,7,8,8-tridecafluorooctyl methacrylate; 3-(perffluoro-5-methylhexyl)-2-hydroxypropyl methacrylate; 3-(perfluoro-7-methyloctyl)-2-hydr methacrylate; 3-(perfluorooctyl)-2-hydroxypropyl methacrylate; perfluoroalkyl sulfonamido methacrylate; cyclically polymerized perfluorobutenyl vinyl ether; cyclically polymerized perfluoroallyl vinyl ether; perfluorodimethyldioxole; 2-(difluoromethylene)-4,4,5-trifluoro-5-(trifluoromethyl)-1,3-dioxolane, perfluorostyrene, α,β,β-trifluorostyrene;

(b) 0 to 93% by weight of one or more monomers selected from the group consisting of methyl methacrylate, isopropyl methacrylate, cyclohexylmethyl methacrylate, cyclohexyl methacrylate, adamantyl methacrylate, tert-butyl methacrylate, isobornyl methacrylate, 2-norbornyl methacrylate, 3,5-dimethyladamantyl methacrylate, 3,3-dimethyl-2-butyl methacrylate, trimethylsilyl methacrylate, phenyl methacrylate, benzyl methacrylate, tetrahydrofurfuryl methacrylate, indenyl methacrylate; hydrogenated indenyl methacrylate; hydrogenated naphthyl methacrylate; 9H-carbazole-9-ethylacrylate; acrylamide, N-methyl-N-phenylacrylamide, N-tert-butylmethacrylamide, styrene, 2-methyl styrene, α-methyl styrene, 2,5-dimethyl styrene, 2,4,6-trimethyl styrene, 2,4,5-trimethyl styrene, 3-(4-biphenylyl)styrene, 4-(4-biphenylyl)styrene, 2,4-diisopropyl styrene, and 2,5-diisopropyl styrene; and (c) 0 to 50% by weight of one or more monomers selected from the group consisting of maleimide, N-methyl maleimide, N-ethyl maleimide, N-isopropyl maleimide, N-cyclohexyl maleimide, N-phenyl maleimide, N-benzyl maleimide, N-trifluoromethyl maleimide, N-pentafluoroethyl maleimide, N-heptafluoroisopropyl maleimide, N-perfluorocyclohexyl maleimide, N-perfluorocyclohexylmethyl maleimide, N-pentafluorophenyl maleimide, N-pentafluorobenzyl maleimide, maleic anhydride, N-vinyl carbazole, N-vinyl pyrrolidone, neopentyloxyethylene, and 2-isopropenyl-2-oxazoline.

EXAMPLE 6

(a) 9% to 100% by weight (based on the total thermoplastic composition) of one or more monomers selected from the group consisting of methyl 2-fluoroacrylate, 2,2,2-trifluoroethyl methacrylate, 1,1,1,3,3,3-hexafluoroisopropyl methacrylate, and perfluorocyclohexylmethyl methacrylate;

(b) 0% to 91% by weight of methyl methacrylate; and (c) 0% to 40% by weight of maleimide.

Transmission Measurements

The total transmission through a fiber optic attenuator depends on three components, viz., (i) the degree to which a light beam spreads conically as it emerges from the end face of a single-mode fiber at one side of the attenuator, (ii) the amplitude of reflections at the fiber/attenuator interfaces on both sides of the attenuator, and (iii) the intrinsic loss of the material used to form the attenuator.

The intrinsic loss of several of the above disclosed materials was measured on free standing films of the material using a Nicolet Magna 760 Fourier Transform Infrared Spectrometer with an indium antimonide detector. The instrument measures light transmission through the film relative to a background acquired with no film present. The raw measurement provided by the instrument is absorbance, which is defined as;

Abs(raw)=log[incident intensity/transmitted intensity].

The measurement includes the reflection losses caused by the two air/film interfaces, and can be adjusted in order to obtain an intrinsic material absorbance which is defined as;

$$Abs(intrinsic)=Abs(raw)+2\log(1-R),$$

where R is the fraction of light reflected at each air/film interface. R in turn may be calculated as;

$$R=(n-1)^2/(n+1)^2,$$

where n is the refractive index of the material under test.

The intrinsic loss of the material in dB per unit length is then given by;

$$Loss\ (dB)=10\ Abs(intrinsic)/thickness,$$

which includes absorption as well as scattering in the material.

The thickness of the material films under test was measured with a precision caliper for films ranging in thickness from 0.35 mm to 0.95 mm. It is important to note that intrinsic loss measurements which are listed below in Table III are specific for the given wavelengths, and that extrapolations to other wavelengths may not always provide correct results since specific absorptions may exist at the other wavelengths.

TABLE III

| Sample | Loss (intrinsic) @ 1310 nm (dB/mm) | Loss (intrinsic) @ 1550 nm (dB/mm) |
|---|---|---|
| FSO 38 | 0.12 | 0.14 |
| FSO 49 | <0.05 | <0.05 |
| FSO 50A | 0.42 | 0.49 |
| FSO 52 | 0.68 | 0.76 |
| FSO 53 | 0.69 | 0.77 |
| FSO 54 | <0.05 | <0.05 |
| FSO 55 | 0.10 | 0.15 |
| FSO 56A | 0.42 | 0.45 |
| FSO 57A | 0.06 | 0.09 |
| Lot 179 | 0.18 | 0.20 |
| Acrilite | 0.10 | 0.12 |
| Acritherm | <0.05 | <0.05 |

Note that all of the materials listed in Table III have an intrinsic loss that is less than one dB/mm, i.e., a relatively high transmissivity.

While the foregoing represents preferred embodiments of the invention, it will be understood by those skilled in the art that various modifications and changes may be made without departing from the spirit and scope of the invention, and that the invention includes all such modifications and changes as come within the scope of the following appended claims.

We claim:

1. An element for attenuating light signals in a fiber optic network comprising a main body portion formed of a thermoplastic polymer, and the main body portion has (i) a refractive index in the range of between about 1.42 and 1.47 as measured at a temperature of 23° C. and a wavelength of 1550 nm, (ii) a glass transition temperature of at least 105° C., and (iii) an intrinsic loss of less than one dB/mm at wavelengths of 1310 nm and 1550 nm.

2. An element according to claim 1, wherein the body portion is generally disc shaped and has a first contact face on a first side of the body portion and a second contact face on a second opposite side of the body portion, and the first and the second contact faces are dimensioned to couple optically with associated first and second optical fibers when ends of the fibers are urged to contact the contact faces on the sides of the body portion.

3. An element for attenuating light signals in a fiber optic network comprising a main body portion formed of a thermoplastic polymer including at least one monomer comprising fluorinated moieties and, optionally, one or more additional monomers, wherein the main body portion has (i) a refractive index in the range of between about 1.42 and 1.47 as measured at a temperature of 23° C. and a wavelength of 1550 nm, (ii) a glass transition temperature of at least 105° C., and (iii) an intrinsic loss of less than one dB/mm at wavelengths of 1310 nm and 1550 nm.

4. An element according to claim 3, wherein the body portion is generally disc shaped and has a first contact face on a first side of the body portion and a second contact face on a second, opposite side of the body portion, and the first and the second contact faces are dimensioned to couple optically with associated first and second optical fibers when ends of the fibers are urged to contact the contact faces on the sides of the body portion.

5. A fiber optic attenuator, comprising:
an attenuator body having a first part constructed and arranged to receive a first end of a first optical fiber, a second part constructed and arranged to receive a second end of a second optical fiber, and a third part; and
an attenuating element according to claim 4, wherein the element is mounted in the third part of the attenuator body so that the first contact face of the body portion of the element is optically coupled to the first end of the first optical fiber when the first part of the attenuator body is connected to said third part, and the second contact face of said body portion is optically coupled to the second end of the second optical fiber when the second part of the attenuator body is connected to said third part.

6. An element for attenuating light signals in a fiber optic network, comprising a main body portion formed of a polymer including methylmethacrylate (MMA) and trifluoroethylmethacrylate (TFEMA), wherein the main body portion has a refractive index (R.I.) in the range of between about 1.42 and 1.47 as measured at a temperature of 23° C. and a wavelength of 1550 nm, and has a glass transition temperature (Tg) of at least 105° C.

7. An element according to claim 6, wherein the body portion is generally disc shaped and has a first contact face on a first side of the body portion and a second contact face on a second, opposite side of the body portion, and the first and the second contact faces are dimensioned to couple optically with associated first and second optical fibers when ends of the fibers are urged to contact the contact faces on the sides of the body portion.

8. An element according to claim 6, wherein the body portion of the element has an intrinsic loss of less than one dB/mm at wavelengths of 1310 nm and 1550 nm.

9. An element for attenuating light signals in a fiber optic network, comprising a main body portion formed of a polymer consisting essentially of polymethyl-2-fluoroacrylate (PMFA), wherein the main body portion has a refractive index in the range of between about 1.42 and 1.47 as measured at a temperature of 23° C. and a wavelength of 1550 nm, and has a Tg of at least 105° C.

10. An element according to claim 9, wherein the body portion is generally disc shaped and has a first contact face on a first side of the body portion and a second contact face on a second, opposite side of the body portion, and the first and the second contact faces are dimensioned to couple optically with associated first and second optical fibers when ends of the fibers are urged to contact the contact faces on the sides of the body portion.

11. An element according to claim 9, wherein the body portion of the element has a Tg of at least 140 degrees C.

12. An element according to claim 9, wherein the body portion of the element has an intrinsic loss of less than one dB/mm at wavelengths of 1310 nm and 1550 nm.

13. An element for attenuating light signals in a fiber optic network, comprising a main body portion formed of a polymer consisting essentially of methylmethacrylate (MMA), trifluoroethylmethacrylate (TFEMA) and a monomer selected from the group comprising maleimide, N-methylmaleimide, N-ethylmaleimide, N-phenylmaleimide and N-cyclohexylmaleimide, wherein the main body portion has a refractive index (R.I.) in the range of between about 1.42 and 1.47 as measured at a temperature of 23° C. and a wavelength of 1550 nm, and has a glass transition temperature (Tg) of at least 105° C.

14. An element according to claim 13, wherein the body portion is generally disc shaped and has a first contact face on a first side of the body portion and a second contact face on a second, opposite side of the body portion, and the first and the second contact faces are dimensioned to couple optically with associated first and second optical fibers when ends of the fibers are urged to contact the contact faces on the sides of the body portion.

15. An element according to claim 13, wherein the body portion of the element has a R.I. of about 1.447.

16. An element according to claim 13, wherein the body portion of the element has an intrinsic loss of less than one dB/mm at wavelengths of 1310 nm and 1550 nm.

17. An element for attenuating light signals in a fiber optic network, comprising a main body portion formed of a polymer consisting essentially of methylmethacrylate (MMA) and one or more monomers selected from the group comprising hexafluoroisopropyl methacrylate (HFIPMA) and perfluorocyclohexyl methylmethacrylate (PFCHMMA), and, optionally, one or more monomers selected from the group comprising maleimide, N-methyl-maleimide, N-ethylmaleimide, N-phenylmaleimide and N-cyclohexylmaleimide, wherein the main body portion has a refractive index (R.I.) in the range of between about 1.42 and 1.47 as measured at a temperature of 23° C. and a wavelength of 1550 nm, and has a glass transition temperature (Tg) of at least 105° C.

18. An element according to claim 17, wherein the body portion is generally disc shaped and has a first contact face on a first side of the body portion and a second contact face on a second, opposite side of the body portion, and the first and the second contact faces are dimensioned to couple optically with associated first and second optical fibers when ends of the fibers are urged to contact the contact faces on the sides of the body portion.

19. An element according to claim 17, wherein the body portion of the element has an intrinsic loss of less than one dB/mm at wavelengths of 1310 nm and 1550 nm.

20. An element according to claim 17, wherein the body portion of the element has a R.I. of between 1.435 and 1.455.

21. An element for attenuating light signals in a fiber optic network comprising a main body portion formed of a thermoplastic polymer comprising fluorine in an amount between about 5 wt. % and 30 wt. %, wherein the main body portion has (i) a refractive index (R.I.) in the range of between about 1.42 and 1.47 as measured at a temperature of 23° C. and a wavelength of 1550 nm, (ii) a glass transition temperature of at least 105° C., and (iii) an intrinsic loss of less than one dB/mm at wavelengths of 1310 nm and 1550 nm.

22. An attenuating element according to claim 21, wherein the main body portion comprises fluorine in an amount between 10 wt. % and 25 wt. %.

23. An attenuating element according to claim 21, wherein the main body portion has a R.I. of between 1.435 and 1.455.

24. An element for attenuating light signals in a fiber optic network, comprising a main body portion formed of a thermoplastic polymer, wherein the main body portion has a refractive index (R.I.) in the range of between about 1.42 and 1.47 as measured at a temperature of 23° C. and a wavelength of 1550 nm, and has a glass transition temperature (Tg) of at least 105° C., wherein the thermoplastic polymer comprises:
  (a) 9% to 100% by weight (based on the total thermoplastic composition) of one or more monomers selected from the group consisting of methyl 2-fluoroacrylate, 2,2,2-trifluoroethyl methacrylate, 1,1,1,3,3,3-hexafluoroisopropyl methacrylate, and perfluorocyclohexylmethyl methacrylate;
  (b) 0% to 91% by weight of methyl methacrylate; and
  (c) 0% to 40% by weight of maleimide.

25. An attenuating element according to claim 24, wherein the R.I. of the main body portion is between 1.435 and 1.455.

26. An element for attenuating light signals in a fiber optic network, comprising a main body portion formed of a thermoplastic polymer, wherein the main body portion has a refractive index (R.I.) in the range of between about 1.42 and 1.47 as measured at a temperature of 23° C. and a wavelength of 1550 nm, and has a glass transition temperature (Tg) of at least 105° C., wherein the thermoplastic polymer comprises:
  (a) 7% to 100% by weight (based on the total thermoplastic composition) of one or more monomers selected from the group consisting of fluorinated acrylates, fluorinated methacrylates, 2-fluoroacrylates, 2-(trifluoromethyl)acrylates, cyclically polymerized perfluoroalkenyl vinyl ethers; fluorinated dioxoles; fluorinated dioxolanes, and fluorinated styrenes; wherein each monomer comprises from 4 to 16 carbon atoms and from 15 wt. % to 71 wt. % fluorine;
  (b) 0 to 93% by weight of one or more monomers selected from the group consisting of acrylates, methacrylates, acrylamides, methacrylamides, styrene, and substituted styrenes, wherein each monomer comprises from 3 to 20 carbon atoms; and
  (c) 0 to 50% by weight of one or more monomers selected from the group consisting of vinyl ethers, alkenyl ethers, maleic acid, maleic anhydride, maleates, substituted maleic acids, substituted maleic anhydrides, maleimides, substituted maleimides, alkenyl oxazolines, acroleins, acenaphtylenes, phenylacetylenes, N-vinyl-carbazoles, substituted citraconomides, itaconamates, itaconates, fumarates, itaconimides, vinyl phosphonates, substituted vinyl pyridazinones, vinyl pyridine, substituted vinyl pyridines, N-vinyl-pyrrolidone, subsituted pyrrolidones, substituted vinyl tetrazoles, substituted vinyl triazoles, olefins, and halogenated olefins; wherein each monomer comprises from 2 to 20 carbon atoms.

27. An attenuating element according to claim 26, wherein the R.I. of the main body portion is between 1.435 and 1.455.

28. An element for attenuating light signals in a fiber optic network, comprising a main body portion formed of a thermoplastic polymer, wherein the main body portion has a refractive index (R.I.) in the range of between about 1.42 and 1.47 as measured at a temperature of 23° C. and a wavelength of 1550 nm, and has a glass transition temperature (Tg) of at least 105° C., wherein the thermoplastic polymer comprises:

(a) 7% to 100% by weight (based on the total thermoplastic composition) of one or more monomers selected from the group consisting of methyl α-fluoroacrylate (also known as methyl 2-fluoroacrylate); 2,2,2-trifluoroethyl α-fluoroacrylate; 2,2,3,3-tetrafluoropropyl α-fluoroacrylate; 2,2,3,3,3-pentafluoropropyl α-fluoroacrylate; 2,2,3,3,4,4-hexafluorobutyl α-fluoroacrylate; 2,2,3,3,4,4,4-heptafluorobutyl α-fluoroacrylate; perfluoro-teit-butyl α-fluoroacrylate; 1-trifluoromethyl-2,2,3,3,-tetrafluoropropyl α-fluoroacrylate; 1-trifluoromethyl-2,2,3,3,3-pentafluoropropyl α-fluoroacrylate; 1,1-dimethyl-2,2,3,3-tetrafluoropropyl α-fluoroacrylate; 1,1-dimethyl-2,2,3,3,3-pentafluoropropyl α-fluoroacrylate; 2,2,3,3,4,4,5,5-octafluoropentyl α-fluoroacrylate; 2,2,3,3,4,4,5,5,5-nonafluoropentyl α-fluoroacrylate; 1,1,1,3,3,3-hexafluoroisopropyl α-fluoroacrylate, 2-trifluoromethyl-2,3,3,3-tetrafluoropropyl α-fluoroacrylate; 2,2-bis(trifluoromethyl)-3,3,3-trifluoropropyl α-fluoroacrylate; perfluorocyclohexylmethyl α-fluoroacrylate; perfluoroisobornyl α-fluoroacrylate; pentafluorophenyl α-fluoroacrylate, pentafluorobenzyl α-fluoroacrylate; 2-(perfluorobutyl) ethyl α-fluoroacrylate; 2-(perfluoro-3-methylbutyl) ethyl α-fluoroacrylate; heptafluoroisopropyl α-fluoroacrylate; hexafluoro-2-methylisopropyl α-fluoroacrylate; 3-(perfluorobutyl)-2-hydroxypropyl α-fluoroacrylate; 2,2,3,3,4,4,5,5,6,6,7,7-dodecafluoroheptyl α-fluoroacrylate; 2,2,3,3,4,4,5,5,6,6,7,7,7-tridecafluoroheptyl α-fluoroacrylate; 2,2,3,3,4,4,5,5,6,6,7,7,8,8,8-pentadecafluorooctyl α-fluoroacrylate; 3,3,4,4,5,5,6,6,7,7,8,8,8-tridecafluorooctyl α-fluoroacrylate; 3-(perfluoro-5-methylhexyl)-2-hydroxypropyl α-fluoroacrylate; 3-(perfluoro-7-methyloctyl)-2-hydroxypropyl α-fluoroacrylate; 3-(perfluorooctyl)-2-hydroxypropyl α-fluoroacrylate; perfluoroalkyl sulfonamido α-fluoroacrylate; methyl 2-(trifluoromethyl)acrylate; tert-butyl 2-(trifluoromethyl) acrylate; 2,2,2-trifluoroethyl methacrylate; 2,2,3,3-tetrafluoropropyl methacrylate; 2,2,3,3,3-pentafluoropropyl methacrylate; 2,2,3,3,4,4-hexafluorobutyl methacrylate; 2,2,3,3,4,4,4-heptafluorobutyl methacrylate; perfluoro-tert-butyl methacryl ate; 1-trifluoromethyl-2,2,3,3,-tetrafluoropropyl methacrylate; 1-trifluoromethyl-2,2,3,3,3-pentafluoropropyl methacrylate; 1,1-dimethyl-2,2,3,3-tetrafluoropropyl methacrylate; 1,1-dimethyl-2,2,3,3,3-pentafluoropropyl methacrylate; 2,2,3,3,4,4,5,5-octafluoropentyl methacrylate; 2,2,3,3, 4,4,5,5,5-nonafluoropentyl methacrylate; 1,1,1,3,3,3-hexafluoroisopropyl methacrylate, 2-trifluoromethyl-2, 3,3,3-tetrafluoropropyl methacrylate; 2,2-bis(trifluoromethyl)-3,3,3-trifluoropropyl methacrylate; perfluorocyclohexylmethyl methacrylate; perfluoroisobornyl methacrylate; pentafluorophenyl methacrylate, pentafluorobenzyl methacrylate; 2-(perfluorobutyl)ethyl methacrylate; 2-(perfluoro-3-methylbutyl)ethyl methacrylate; heptafluoroisopropyl methacrylate; hexafluoro-2-methylisopropyl methacrylate; 3-(perfluorobutyl)-2-hydroxypropyl methacrylate; 2,2,3,3,4, 4,5,5,6,6,7,7-dodecafluoroheptyl methacrylate; 2,2,3,3, 4,4,5,5,6,6,7,7,7-tridecafluoroheptyl methacrylate; 2,2, 3,3,4,4,5,5,6,6,7,7,8,8,8-pentadecafluorooctyl methacrylate; 3,3,4,4,5,5,6,6,7,7,8,8,8-tridecafluorooctyl methacrylate; 3-(perfluoro-5-methylhexyl)-2-hydroxypropyl methacrylate; 3-(perfluoro-7-methyloctyl)-2-hydroxypropyl methacrylate; 3-(perfluorooctyl)-2-hydroxypropyl methacrylate; perfluoroalkyl sulfonamido methacrylate; cyclically polymerized perfluorobutenyl vinyl ether; cyclically polymerized perfluoroallyl vinyl ether; perfluorodimethyldioxole; 2-(difluoromethylene)-4,4,5-trifluoro-5-(trifluoromethyl)-1,3-dioxolane, perfluorostyrene, α,β,β-trifluorostyrene;

(b) 0 to 93% by weight of one or more monomers selected from the group consisting of methyl methacrylate, isopropyl methacrylate, cyclohexylmethyl methacrylate, cyclohexyl methacrylate, adamantyl methacrylate, fert-butyl methacrylate, isobornyl methacrylate, 2-norbornyl methacrylate, 3,5-dimethyladamantyl methacrylate, 3,3-dimethyl-2-butyl methacrylate, trimethylsilyl methacrylate, phenyl methacrylate, benzyl methacrylate, tetrahydrofurfuryl methacrylate, indenyl methacrylate; hydrogenated indenyl methacrylate; hydrogenated naphthyl methacrylate; 9H-carbazole-9-ethylacrylate; acrylamide, N-methyl-N-phenylacrylamide, N-tert-butylmethacrylamide, styrene, 2-methyl styrene, (α-methyl styrene, 2,5-dimethyl styrene, 2,4,6-trimethyl styrene, 2,4,5-trimethyl styrene, 3-(4-biphenylyl)styrene, 4-(4-biphenylyl) styrene, 2,4-diisopropyl styrene, and 2,5-diisopropyl styrene; and (c) 0 to 50% by weight of one or more monomers selected from the group consisting of maleimide, N-methyl maleimide, N-ethyl maleimide, N-isopropyl maleimide, N-cyclohexyl maleimide, N-phenyl maleimide, N-benzyl maleimide, N-trifluoromethyl maleimide, N-pentafluoroethyl maleimide, N-heptafluoroisopropyl maleimide, N-perfluorocyclohexyl maleimide, N-perfluorocyclohexylmethyl maleimide N-pentafluorophenyl maleimide, N-pentafluorobenzyl maleimide, maleic anhydride, N-vinyl carbazole, N-vinyl pyrrolidone, neopentyloxyethylene, and 2-isopropenyl-2-oxazoline.

29. An attenuating element according to claim 28, wherein the R.I. of the main body portion is between 1.435 and 1.455.

* * * * *